US011663506B2

(12) United States Patent
Ragnoli et al.

(10) Patent No.: US 11,663,506 B2
(45) Date of Patent: May 30, 2023

(54) ESTIMATION OF POWER CONSUMPTION OF PROOF OF WORK CONSENSUS BASED DISTRIBUTED SYSTEMS

(71) Applicant: INTERNATIONAL BUSINESS MACHINES CORPORATION, Armonk, NY (US)

(72) Inventors: Emanuele Ragnoli, Mulhuddart (IE); Sean A. McKenna, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 358 days.

(21) Appl. No.: 16/840,807

(22) Filed: Apr. 6, 2020

(65) Prior Publication Data

US 2021/0312303 A1     Oct. 7, 2021

(51) Int. Cl.
G06N 5/04        (2023.01)
G06F 16/27       (2019.01)
H04L 9/06        (2006.01)
G06F 16/23       (2019.01)
G06F 1/28        (2006.01)
H04L 9/32        (2006.01)
H04L 9/00        (2022.01)

(52) U.S. Cl.
CPC .............. G06N 5/04 (2013.01); G06F 1/28 (2013.01); G06F 16/2379 (2019.01); G06F 16/27 (2019.01); H04L 9/0637 (2013.01); H04L 9/0643 (2013.01); H04L 9/3218 (2013.01); H04L 9/50 (2022.05)

(58) Field of Classification Search
None
See application file for complete search history.

(56) References Cited

U.S. PATENT DOCUMENTS

2018/0005318 A1*  1/2018  Pierce ............... G06Q 20/065
2018/0294955 A1  10/2018  Rhie et al.

FOREIGN PATENT DOCUMENTS

WO      WO202185905       *  3/2020

OTHER PUBLICATIONS

Funkenstein, the Dwarf "Bitcoin Emissions" [online] Woodcoin. info, Nov. 2018 [retrieved May 2, 2022]. Retrieved from the Internet: URL: http://woodcoin.info/2018/11/02/bitcoin-emissions-alone-will-cause-global-warming/ (Year: 2018).*
Van Name, Joseph "Heat rises over cryptocurrencies' energy costs" comment section [online] New Money Review, Oct. 2018 [retrieved May 2, 2022]. Retrieved from the Internet: URL: https://newmoneyreview.com/index.php/2018/04/08/heat-rises-over-cryptocurrencies-energy-costs/ (Year: 2018).*

(Continued)

Primary Examiner — Linglan Edwards
Assistant Examiner — Joshua Raymond White
(74) Attorney, Agent, or Firm — Griffiths & Seaton PLLC (57) ABSTRACT

A system and method for providing power consumption data for a distributed system in blockchains in a computer environment are presented. Energy consumption of one or more blockchain nodes in a blockchain network that achieves a consensus by a proof of work on a plurality of transactions upon executing a cryptographic operation may be determined.

18 Claims, 8 Drawing Sheets

(56) References Cited

OTHER PUBLICATIONS

Debus, Julian "Consensus Methods in Blockchain Systems" [online] FSBC, May 2017 [retrieved May 2, 2022]. Retrieved from the Internet: URL: http://explore-ip.com/2017_Consensus-Methods-in-Blockchain-Systems.pdf (Year: 2017).*

Landauer, Rolf "Irreversibility and Heat Generation in the Computing Process" [online] Worrydream, Jul. 1961 [retrieved May 2, 2022]. Retrieved from the Internet: URL: http://worrydream.com/refs/Landauer%20-%20Irreversibility%20and%20Heat%20Generation%20in%20the%20Computing%20Process.pdf (Year: 1961).*

Bennett, Charles "Notes on Landauer's principle, reversible computation, and Maxwell's Demon" [online] IBM, Jan. 2003 [retrieved May 2, 2022]. Retrieved from the Internet: URL: https://citeseerx.ist.psu.edu/viewdoc/download?doi=10.1.1.205.5634&rep=rep1&type=pdf (Year: 2003).*

Murphy, Bernard "About That Landauer Limit . . . " [online] SemiWiki, Oct. 2015 [retrieved May 2, 2022]. Retrieved from the Internet: URL: https://semiwiki.com/eda/5103-about-that-landauer-limit/ (Year: 2015).*

Vranken, Harald "Sustainability of bitcoin and blockchains" [online] ScienceDirect, Apr. 2017 [retrieved Oct. 20, 2022]. Retrieved from the Internet: URL: https://shop.tarjomeplus.com/UploadFileEn/TPLUS_EN_3047.pdf (Year: 2017).*

Carter, Nic "Digesting Quantification of energy and carbon costs for mining cryptocurrencies" Medium, Nov. 2018 [retrieved Oct. 20, 2022]. Retrieved from the Internet: URL: https://medium.com/@nic_carter/digesting-quantification-of-energy-and-carbon-costs-for-mining-cryptocurrencies-1f019e10fad4 (Year: 2018).*

"A Secure, Efficient, and Transparent Network Architecture for Bitcoin" Ozisik et al. (22 Pages).

"Estimation of Miner Hash Rates and Consensus on Blockchains" Ozisik et al. Jul. 1, 2017 (13 Pages).

"Energy Consumption-Bitcoin's Achilles Heel" Mishra et al. (10 Pages).

* cited by examiner

ESTIMATION OF POWER CONSUMPTION OF PROOF OF WORK CONSENSUS BASED DISTRIBUTED SYSTEMS

BACKGROUND OF THE INVENTION

Field of the Invention

The present invention relates in general to computing systems, and more particularly to, various embodiments for providing estimation of the power consumption of proof of work consensus in blockchains using a processor.

Description of the Related Art

In today's society, consumers, corporate/business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computing systems.

SUMMARY OF THE INVENTION

Various embodiments for providing power consumption data for a distributed system in blockchains using one or more processors are provided. In one embodiment, by way of example only, a method for providing power consumption data for a distributed system in blockchains, again by a processor, is provided. Energy consumption of one or more blockchain nodes in a blockchain network that achieves a consensus by a proof of work on a plurality of transactions upon executing a cryptographic operation may be determined.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

A distributed file system such as, for example, a blockchain, may be used in computing systems. Blockchains or blockchain is a distributed database that keeps a continuously growing list of data records. Each data record is protected against tampering and revisions. Blockchains are used with public ledgers of transactions, where the record is enforced cryptographically.

Said differently, a blockchain is distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

Additionally, the blockchain database maintains a continuously growing list of data records and is formed from blocks of data records that are connected together through the use of hashing. For example, every time a new block is added to the blockchain, the new block includes a hash of a prior block. In this manner, each additional block creates additional security for the validity of the entire blockchain. Each block records and confirms the sequence and timing of transactions, e.g., smart contracts, as they are created and/or executed. That is, smart contracts provide for the storage of data within blockchain transactions and may also be automatically executed when predetermined terms and conditions are met. Thus, blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain. This process is often called "consensus". During consensus, validator nodes of the blockchain may vote on whether each submitted transaction is valid and the order in which to add the transactions to the blockchain. A distributed consensus, for example, may be a consensus (i.e., global agreement) between many mutually-distrusting parties who lack identities and were not necessarily present at the time of system set up.

Once ordered, the transactions are packaged into blocks which are in turn appended to the blockchain. If a consensus to add the new block is reached (e.g., a threshold number of "for" votes), the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

However, limited transaction throughput and storage are widely understood problems of blockchain technology along with power consumptions required in the blockchain. A blockchain may use a proof of work consensus to verify but which is computationally expensive (by design) and requires solving a cryptographic puzzle in the process. The proof of work includes data that is generated based on requirements of a blockchain. Generating a proof of work may be measured in terms of the amount of computing resources required to perform the proof of work. Producing a proof of work can be a random process with low probability so that a certain amount of trial and error can be needed before a valid proof of work is generated. The proof of work may be based on blockchain transaction data that is modified into a valid hash. Aside the signing and verification of transaction with cryptographic means, the nodes on the distributed network (e.g., peer-to-peer) may solve a cryptographic puzzles (e.g., an inversion of non-invertible mathematical function such as, for example, a hash function) to accomplish the proof of work consensus. The consensus operations may be compared to consuming a scarce resource (e.g., power) in order to validate a transaction in exchange of a measurable quantity (trust, coins, tokens, etc.).

Accordingly, the present invention provides for the estimation of power consumption of proof of work consensus based distributed systems. In one aspect, energy consumption of one or more blockchain nodes in a blockchain network that achieves a consensus by a proof of work on a plurality of transactions may be estimated upon executing a cryptographic operation may be determined.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a health state/patient profile). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects yielding better results. Thus, some changes to the variety of factors may result in a jump from one minimum/maximum to another minimum/maximum. In either case, resulting suggestions of a combination of sections of the optimal/best executor nodes may be determined by whatever "bid matching function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best executor nodes.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
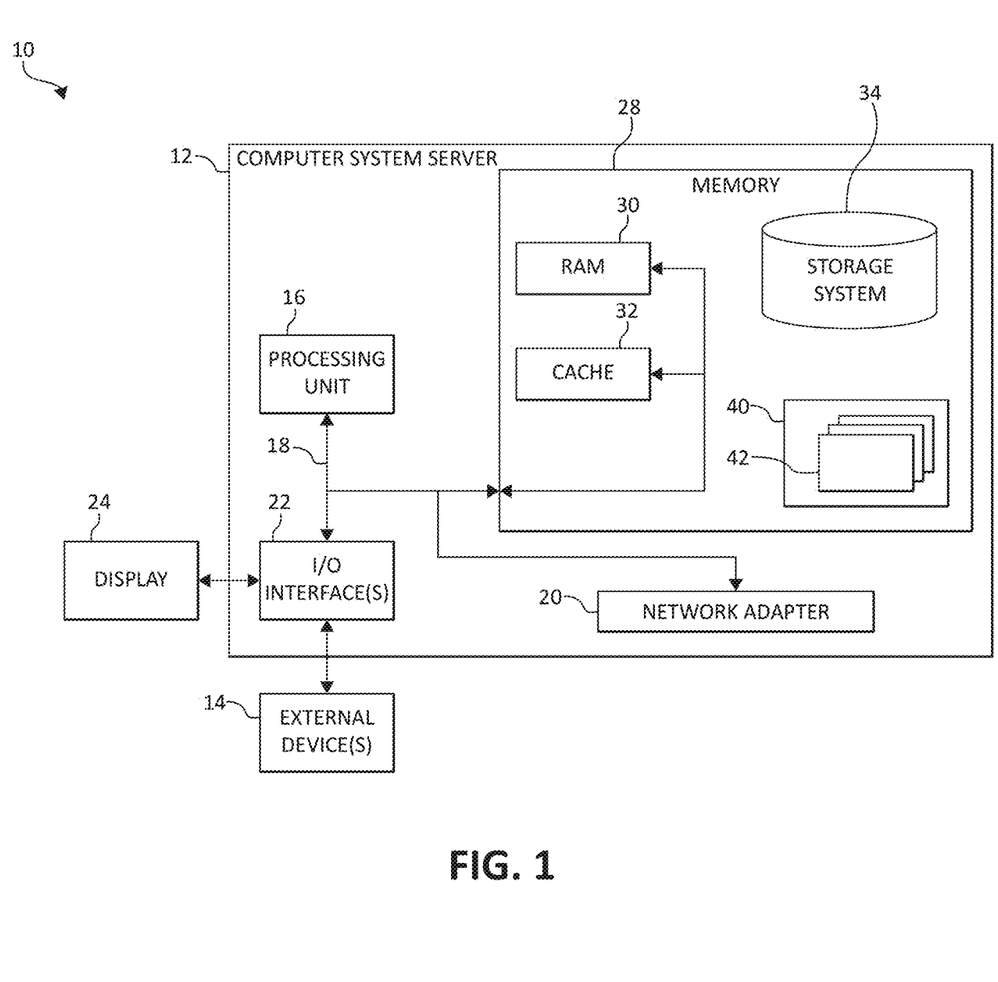
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
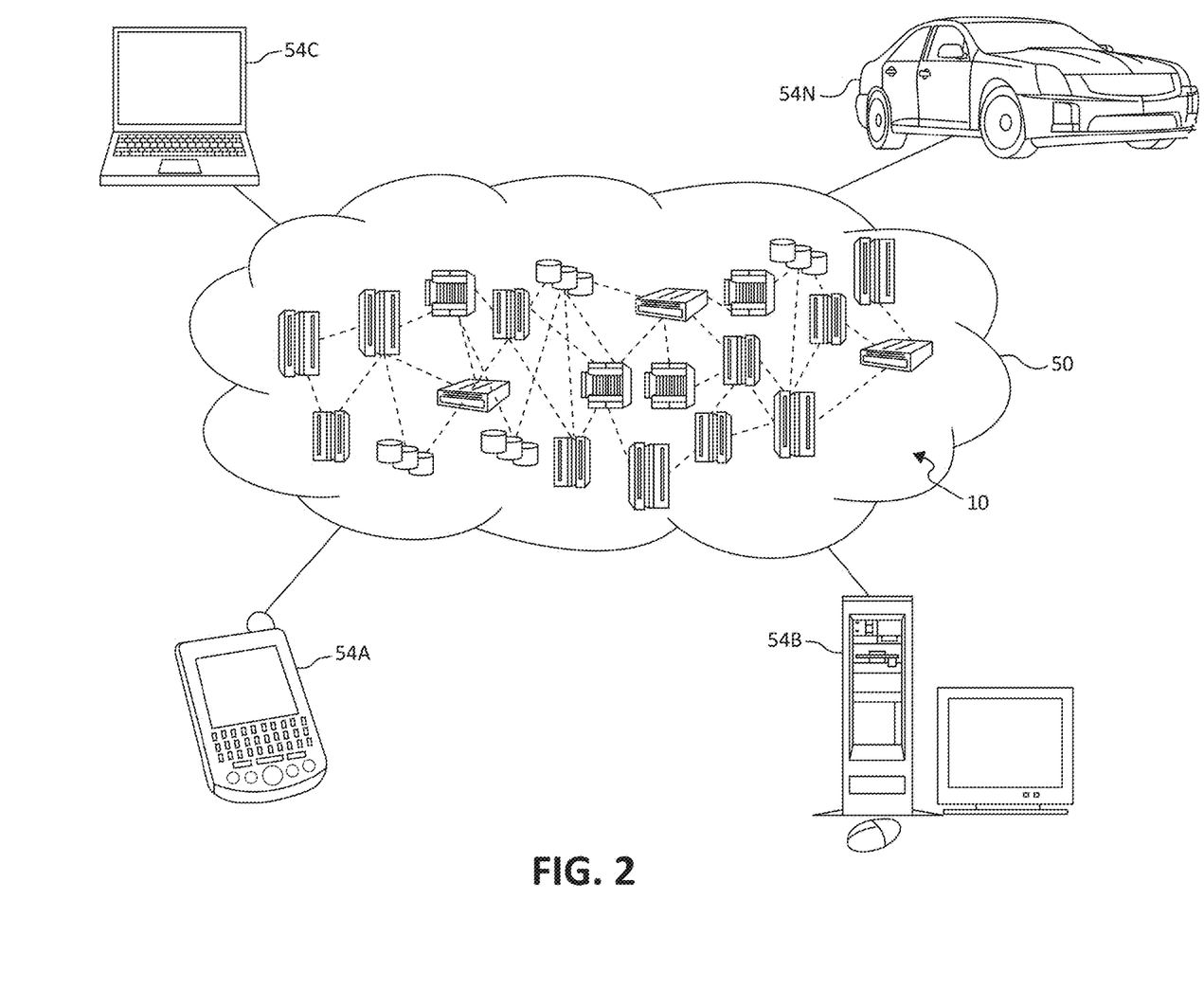
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
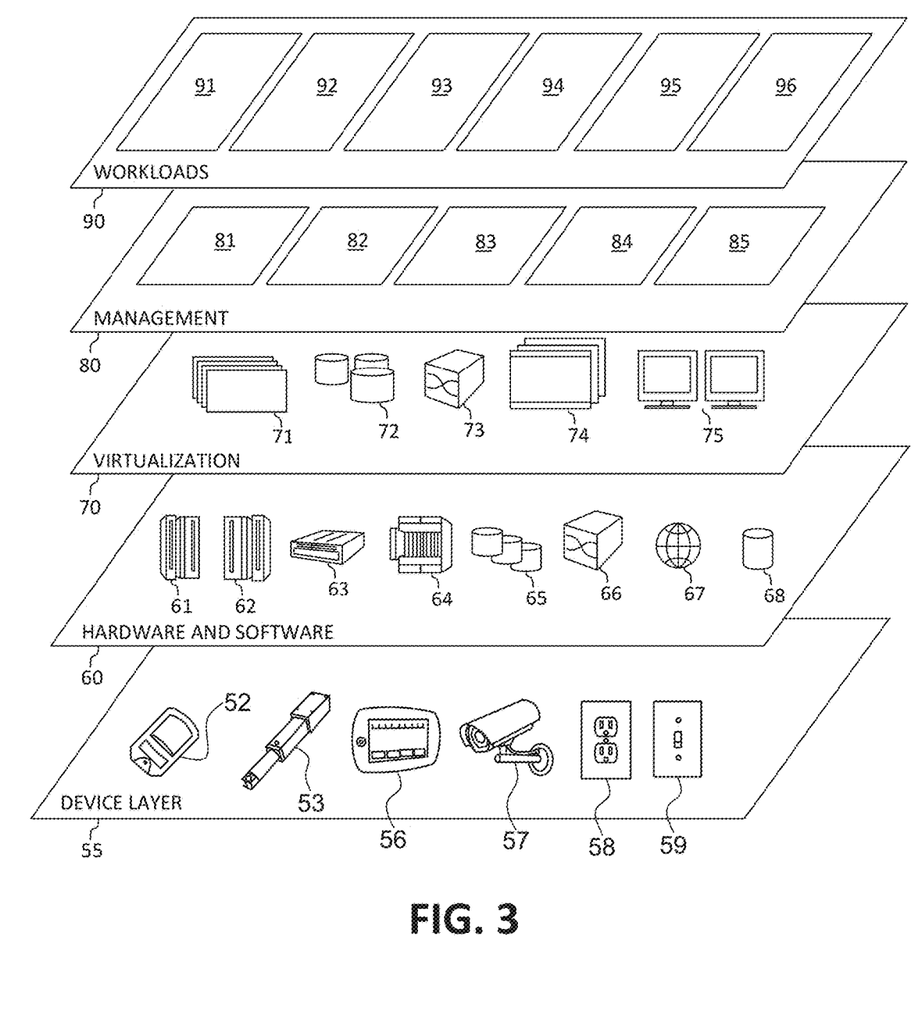
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing/providing a marketplace for risk assessed smart contracts issuers and execution providers. In addition, workloads and functions 96 for implementing/providing a marketplace for risk assessed smart contracts issuers and execution providers may include such operations as data analytics, data analysis, and as will be further described, notification functionality. One of ordinary skill in the art will appreciate that the workloads and functions 96 for implementing/providing a marketplace for risk assessed smart contracts issuers and execution providers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
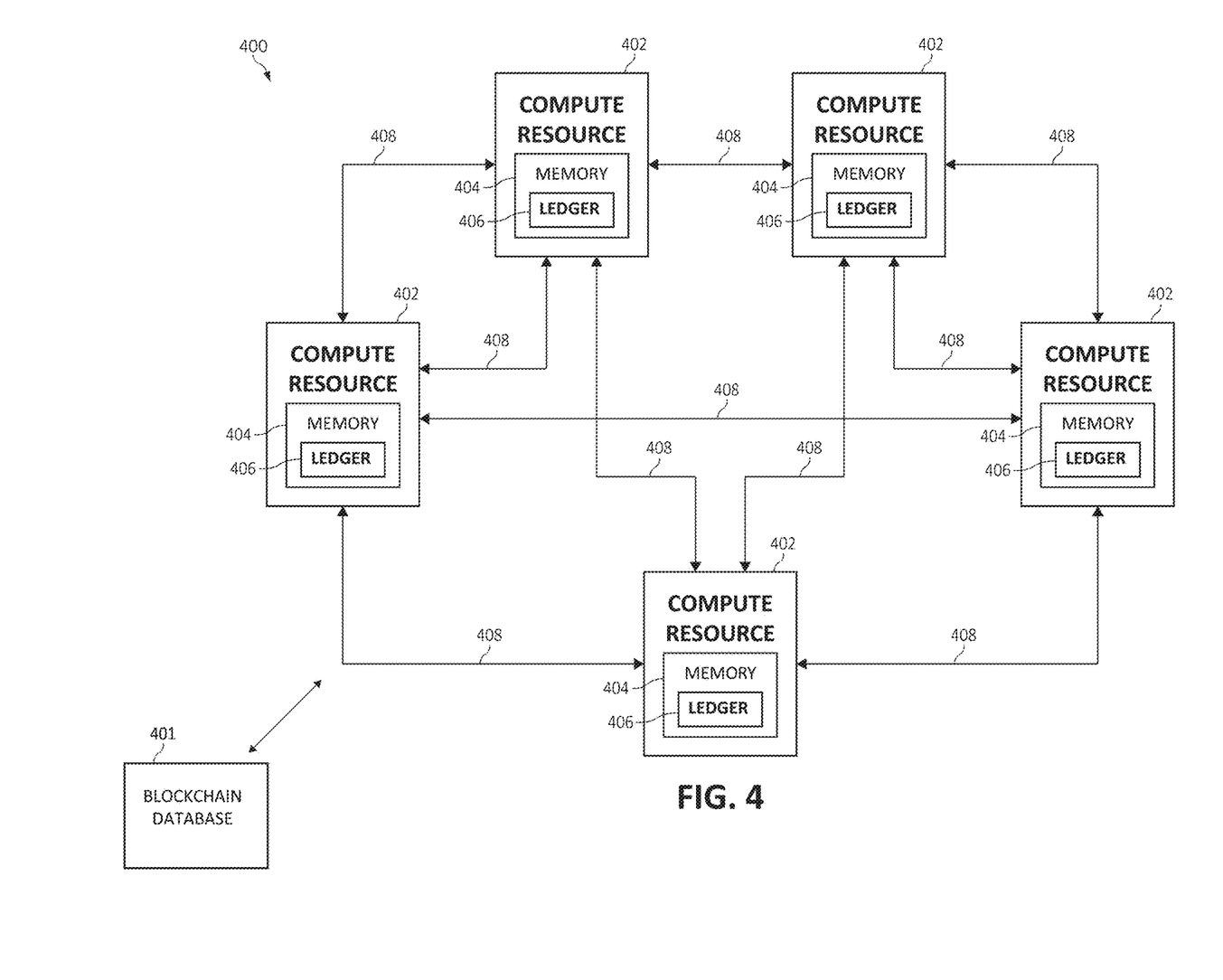
FIG. 4 is an additional block diagram depicting a decentralized network containing a blockchain database, host devices and entity devices (compute resources) in which aspects of the present invention may be realized.

Turning now to FIG. 4, a block diagram depicting exemplary functional components of system 400 (e.g., a blockchain system 400) according to various mechanisms of the illustrated embodiments is shown. FIG. 4 illustrates the system 400 for providing estimation of the power consumption of proof of work consensus in a blockchain in a computing environment.

As will be seen, many of the functional blocks may also be considered "modules" or "components" of functionality, in the same descriptive sense as has been previously described in FIGS. 1-3. With the foregoing in mind, the module/component blocks of system 400 (e.g., a blockchain network) and may also be incorporated into various hardware and software components of a system estimation of the power consumption of proof of work consensus in a blockchain in accordance with the present invention. Many of the functional blocks of system 400 may execute as background processes on various components, either in distributed computing components, or on the user device, or elsewhere.

In one aspect, the computer system/server 12 of FIG. 1 may be included in FIG. 4 and function as blockchain database that may be a decentralized database including one or more compute resources 402, as shown, for example, in FIG. 4. In one aspect, there may be no central authority controlling blockchain database. In some embodiments, the data stored on blockchain database, i.e., the public ledger, may not be stored at a central location in its entirety.

Compute resources 402 may include any device, computer, system or otherwise that has joined blockchain database 401 and forms a node in the blockchain database 401 (which may in the computer system/server 12 of FIG. 1 and/or provided by the computer system/server 12 of FIG. 1). Compute resources 402 (which may be included as a separate and/or individual computer system/server 12 of FIG. 1 and/or provided by the computer system/server 12 of FIG. 1) may also be may include but are not limited to, for example, personal computers, servers, cell phones, tablets, laptops, smart tv's, or any other device capable of storing information and communicating over a network. In some embodiments, compute resources 402 may be unaffiliated with or unknown to each other where, for example, compute resources 402 remain anonymous. Each compute resource 402 may include a memory 404 that stores a copy of at least a portion of the public ledger 406 of blockchain database 401. Compute resources may also execute one or more programs to perform various functions associated with maintaining blockchain database 401 including, for example, updating the public ledger 406, generating new blocks, or any other similar function.

Public ledger 406 may store any transactions performed over blockchain database including but not limited to, for example, smart contracts created by host devices, transactions involving the created smart contracts, a directory (contract), device registry (contract), device contracts, device accounts, or any other transaction related to and occurring on blockchain database. Because each of the compute resources 402 stores a copy of at least a portion of the public ledger 406 of blockchain database, public ledger 406 may be independently verified for accuracy at any time by comparing the stored copies of the multiple compute resources 402.

Communication between compute resources 402 may occur via a communications network 408. Communications network 408 may include any wired or wireless connection, the internet, or any other form of communication. In some embodiments, each compute resource 402 may communicate directly with each other compute resource 402 via communications network 408.

In one aspect, one of the compute resources may be a first compute resource 402 and may not be able to communication directly with another one of the one of the compute resources, which may be considered as a second compute resource, for example, where both a first and a second compute resources may not be connected to the same communications network 408. In this case, communications related to blockchain database between the first and second compute resources (of the multiple compute resources 402) may occur by using one or more of the remaining compute resources 402 as an intermediary. In some embodiments, one or more of compute resources 402 may not maintain a connection to blockchain database 401 at all times. For example, one of the compute resources 402 (e.g., a first compute resources) may only be connected to blockchain database 401 during a certain period of time each day or may only be connected to blockchain database 401 intermittently throughout the day. Due to the decentralized nature of blockchain database 401, such an intermittent connection by one or more compute resources 402 does not affect the overall operation of blockchain database 401 since copies of public ledger 406 are stored on multiple compute resources 402. Once one or more of the multiple compute resources 402 are disconnected, one or more of the multiple compute resources 402 (which may be disconnected) may reconnect to blockchain database 401, and the one or more of the multiple compute resources 402 that have been disconnected and now reconnected may receive updated copies of the public ledger 406 from one or more of the compute resources 402 (e.g., remained connected with other compute resources 402 were disconnected) that have been connected to blockchain database 401.

Figure 5:
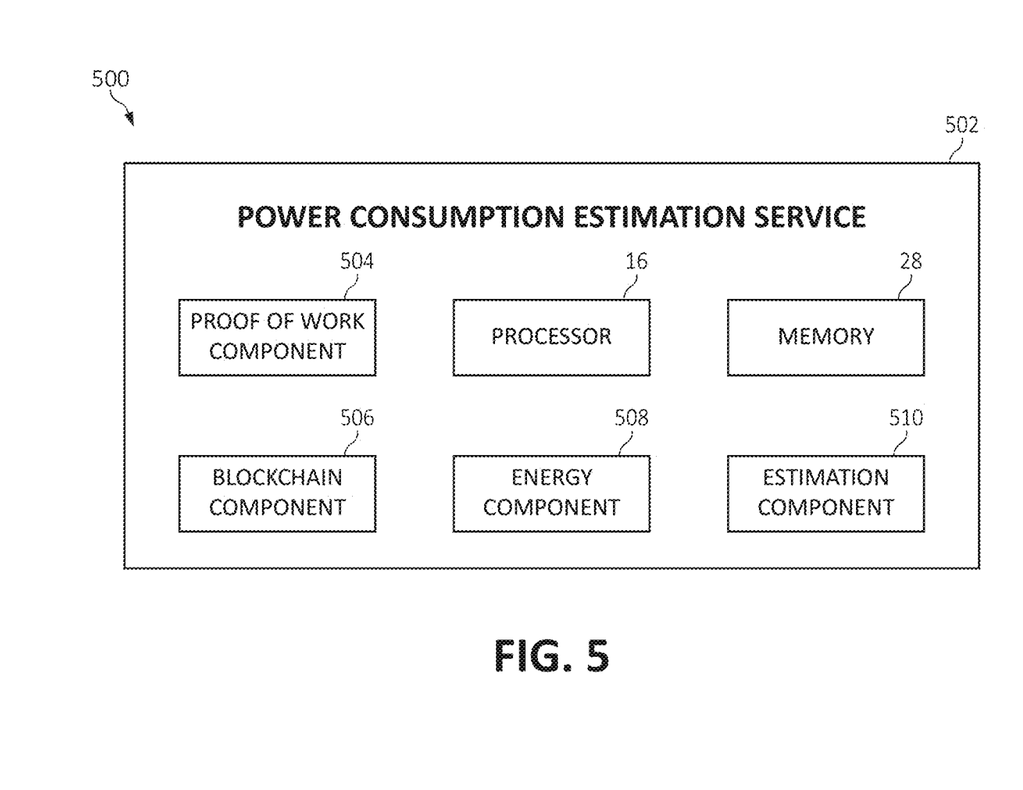
FIG. 5 is block diagram depicting an additional exemplary operations for providing estimation of the power consumption of proof of work consensus in blockchains in a by a processor in which aspects of the present invention may be realized.

Turning to FIG. 5, a block diagram of various hardware 500 equipped with various functionality as will be further described is shown in which aspects of the mechanisms of the illustrated embodiments may be realized. In one aspect, one or more of the components, modules, services, applications, and/or functions described in FIGS. 1-4 may be used in FIG. 5. For example, computer system/server 12 of FIG. 1 may be included in FIG. 5 and may be connected to other computing nodes (such as computer systems of vehicles) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16. In one aspect, repetitive description of like elements, components, modules, services, applications, and/or functions employed in other embodiments described herein (e.g., FIGS. 1-4) is omitted for sake of brevity.

The computer system/server 12 of FIG. 1, may include a power consumption estimation service 502, along with other related components in order to estimate power consumption of proof of work consensus in distributed file systems (e.g., blockchains).

The power consumption estimation service 502 may include proof of work component 504, a blockchain component 506, an energy component 508, and an estimation component 510.

The proof of work component 504, in association with the blockchain component 406, the energy component 508, and/or the estimation component 510 may estimate energy consumption of one or more blockchain nodes in a blockchain network that achieves a consensus by a proof of work on a plurality of transactions upon executing a cryptographic operation.

The estimation component 510 may estimate entropy of each of the one or more blockchain nodes according to a degree of difficulty for the proof of work. The estimation component 510, in association with the blockchain component 506, may estimate a number of the plurality of transactions of the one or more blockchain nodes for both a total hashing power and a local hashing power.

The energy component 510 may determine an entropy lower bound for an increase in entropy using an irreversible bit operation. The energy component 510, in association with the energy component 510 may apply the entropy lower bound to the plurality of transaction on each of the one or more blockchain nodes and/or estimate the entropy increase for the one or more blockchain nodes.

The proof of work component 504, in association with the blockchain component 406, the energy component 508, and/or the estimation component 5 may determine the entropy per node using a Landauer limit that establishes a lower bound for an increase in the entropy by an irreversible bit operation, determine an average energy consumption for each of the one or more blockchain nodes using the entropy lower bound on the proof of work in the blockchain network, and/or solve a cryptographic puzzle to achieve the proof of work consensus for executing the cryptographic operation.

In one aspect, the blockchain system 400 of FIG. 4 may be in association with the power consumption estimation service 502. That is, the blockchain system 400 of FIG. 4 may be a distributed database that may be external to and/or internal to the power consumption estimation service 502. The blockchain system 400 of FIG. 4 may be used for performing the transactions of the one or more blockchain nodes and/or performing the proof of work on a plurality of transactions.

Figure 6:
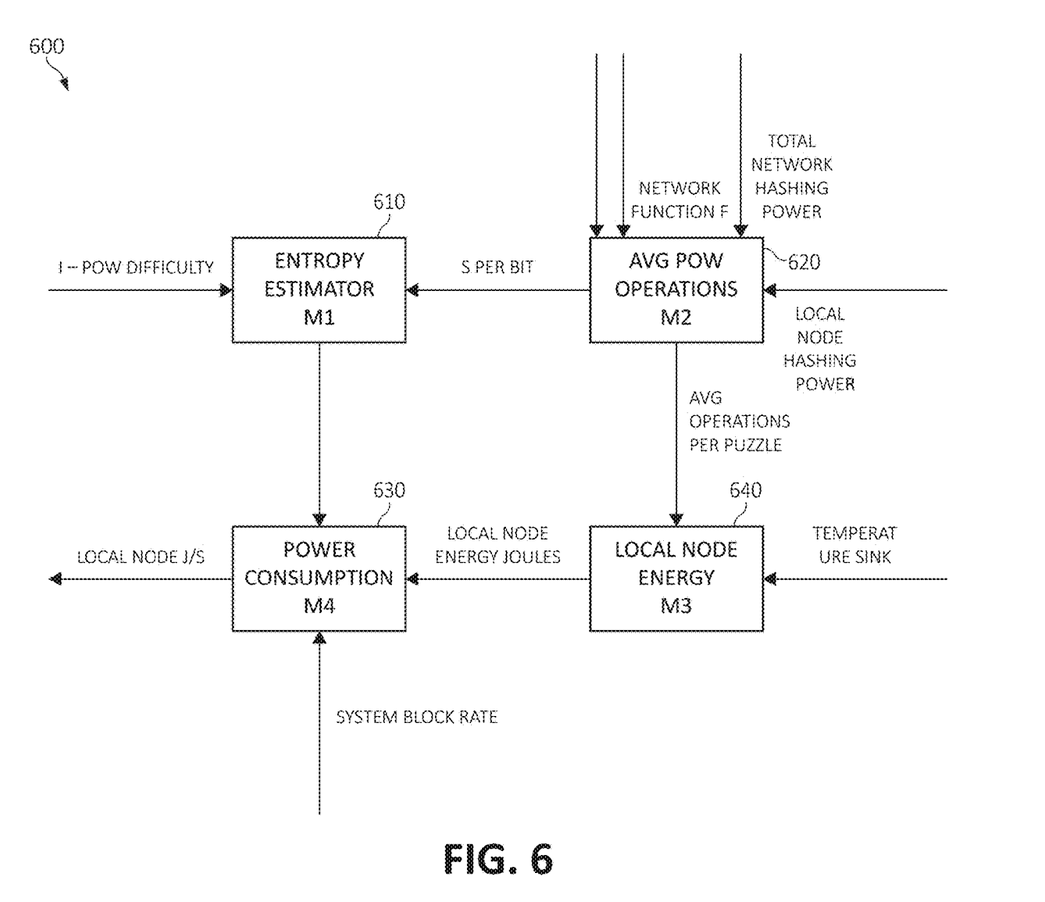
FIG. 6 is block diagram depicting an additional exemplary operations for estimating the power consumption of a blockchain node when participating in PoW consensus using one or more processors in which aspects of the present invention may be realized.

FIG. 6 is block diagram 600 depicting an additional exemplary operations for estimating the power consumption of a blockchain node when participating in PoW consensus using one or more processors. In one aspect, one or more of the components, modules, services, applications, and/or functions described in FIGS. 1-5 may be used in FIG. 6. For example, computer system/server 12 of FIG. 1 may be included in FIG. 6 and may be connected to other computing nodes (such as computer systems of vehicles) over a distributed computing network, where additional data collection, processing, analytics, and other functionality may be realized. In one aspect, repetitive description of like elements, components, modules, services, applications, and/or functions employed in other embodiments described herein (e.g., FIGS. 1-5) is omitted for sake of brevity.

In an additional aspect, mechanisms of the illustrated embodiments provide for estimating the power consumption of a blockchain node when participating in a proof of work ("PoW") consensus. A theory of reversible computing of Rolf Landauer (e.g., "Landauer operation") may be leveraged and a Landauer limit establishes a lower bound for an increase in entropy (of a system) by any irreversible bit operation. A classification operation may classify as irreversible any attempt at a PoW operation (e.g., PoW solution). The entropy lower bound may be applied to the PoW operations of a node (e.g., blockchain nodes) and estimates the overall entropy increase by using the probability of a PoW solution as a function of its bits and its central processing unit ("CPU") computations.

In an additional aspect, one or more components may be a module/component ("M1" or "entropy estimator M" 610) that outputs the lower bound for PoW distributed systems, 2) a module/component ("M2" or "average 'avg' PoW operations M2" 620) that outputs the average number of bit operations required to solve a PoW puzzle (e.g., a cryptographic puzzle) based on the ratio of its computational power over the rest of the distributed system/network (e.g., blockchain), and a module/component ("M3" or "local energy node energy M3" 630) that determines/computes the average energy of a blockchain node by taking, as input, the outputs of M2 and M1, and 4) a module/component ("M4" or "power consumption M4" 640) that module that determines/computes the power consumption based on the output of M3 and the overall block rate.

In one aspect, for example, the component M1 may be an entropy estimator for one PoW operations. In one aspect, the input may be complexity of the PoW puzzle in bits where the bits are equal to ith bits (e.g., bits=i). In operation, the M1, at block 610, may execute the entropy per bit as lower bound estimation according to the following equation:

$$kln2*i \quad (1).$$

The component M2, at block 620, may be/provide the estimation of average number of PoW operations. In one aspect, the input may be a total network s ("Th/s") (Tera Hashing or "1,000,000,000,000 hashes", which may be applied in the context of POW mining such as, for example, 5 Th/s which means a system may be able to perform 5 trillion hashing operations per second) and the node Th/s is $s_{\{k\}}$. In operation, the M2, at block 620, may perform and determine a computational stake ratio that is equal to the total network divided by the nodes (e.g., computation stake ration is $=s/s_{\{k\}}$, determine the average number of operations "m" according to the following equation:

$$m = f\left(\frac{s}{s_{\{k\}}}, network_{bandwith}, block\ propagation\ rate\right)*kln2*i*m, \quad (2)$$

where "kln2*i*m" is the entropy per bit as lower bound estimation, and "$f$" is a function that can be computed with a variety of network models and may be based on a random walk model of the blockchain network, in which the model estimates the probability of a blockchain node to stop or solve a PoW solution.

The component M3, at block 630, may be/provide the energy for a local node where the inputs may be the entropy estimator for one PoW operations (e.g., M1), the estimation of average number of PoW operations (e.g., M2 or "average operations per cryptographic puzzle), and a temperature ("T") sink of the system. In operation, the component M3, at block 630, may perform and determine the energy "E" according to the following equation:

$$E=T*kln2*i*m \quad (3).$$

The component M4, at block 640, may be/provide the estimation of power consumption where the inputs may be the energy for a local node (e.g., M3 or local node energy joules) and/or a block rate (e.g., "Br"). In operation, the component M4 may determine the power "P" (e.g., the local nodes J/s) according to the following equation:

$$P=E/Br \quad (4).$$

Figure 7:
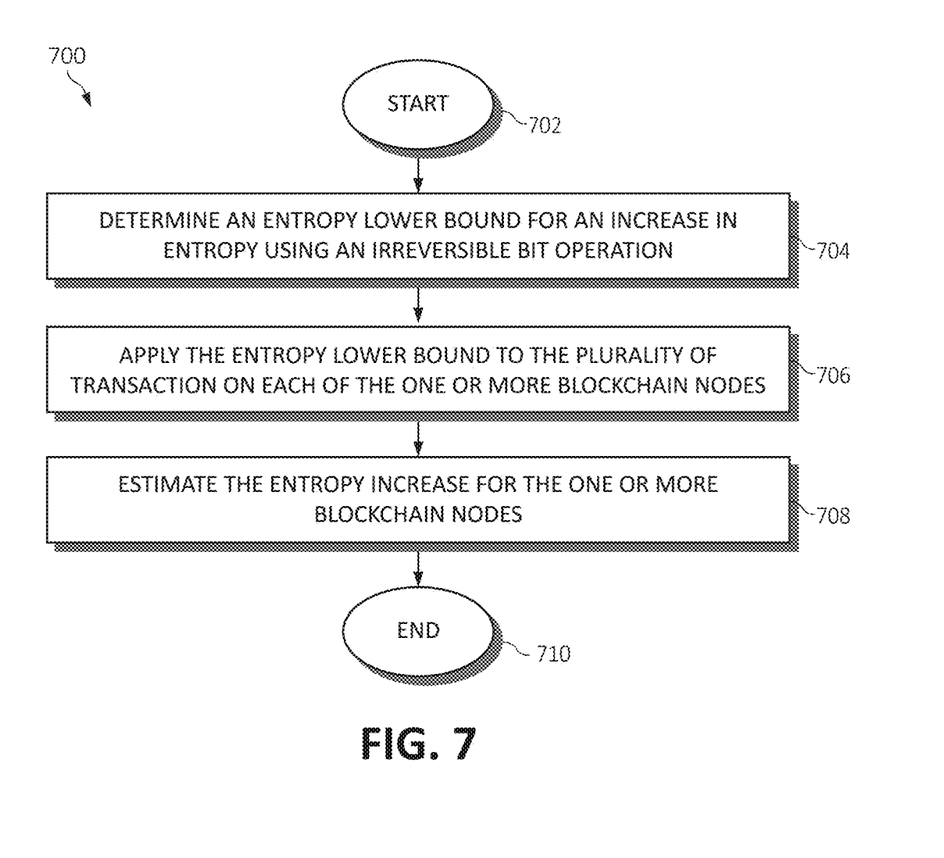
FIG. 7 is an additional flowchart diagram depicting an exemplary method for providing estimation of the power consumption of proof of work consensus in blockchains in which aspects of the present invention may be realized.

Turning now to FIG. 7, a method 700 for providing estimation of the power consumption of proof of work consensus in blockchains by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

An entropy lower bound may be determined for an increase in entropy using an irreversible bit operation, as in block 704. The entropy lower bound may be applied to the plurality of transaction on each of the one or more blockchain nodes, as in block 706. The entropy increase for the one or more blockchain nodes may be estimated, as in block 708. The functionality 700 may end, as in block 710.

Figure 8:
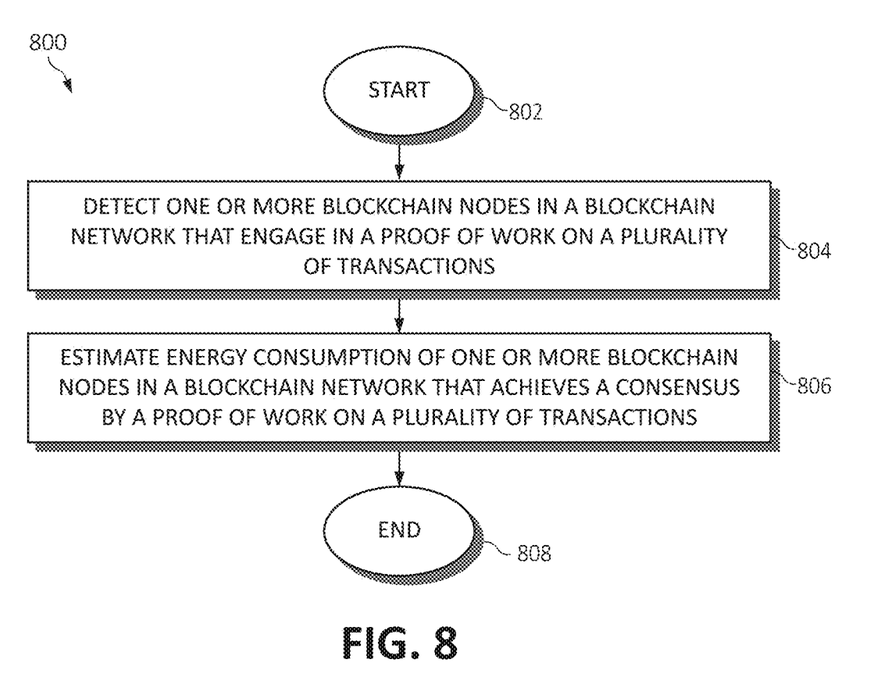
FIG. 8 is an additional flowchart diagram depicting an exemplary method for providing estimation of the power consumption of proof of work consensus in blockchains by a processor, again in which aspects of the present invention may be realized.

Turning now to FIG. 8, a method 800 for providing estimation of the power consumption of proof of work consensus in blockchains by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more blockchain nodes in a blockchain network that engage in a proof of work on a plurality of transactions may be detected, as in block 804. Energy consumption of one or more blockchain nodes in a blockchain network that achieves a consensus by a proof of work on a plurality of transactions upon executing a cryptographic operation may be determined, as in block 806. The functionality 800 may end, as in block 808.

In one aspect, in conjunction with and/or as part of at least one block of FIG. 8, the operations of method 800 may include each of the following. The operations of method 800 may estimate entropy of each of the one or more blockchain nodes according to a degree of difficulty for the proof of work and estimate a number of the plurality of transactions of the one or more blockchain nodes for both a total hashing power and a local hashing power.

The operations of method 800 may determine an entropy lower bound for an increase in entropy using an irreversible bit operation. The operations of method 800 may apply the entropy lower bound to the plurality of transaction on each of the one or more blockchain nodes and estimate the entropy increase for the one or more blockchain nodes.

The operations of method 800 may determine the entropy per node using a Landauer limit that establishes a lower bound for an increase in the entropy by an irreversible bit operation and/or determine an average energy consumption for each of the one or more blockchain nodes using the entropy lower bound on the proof of work in the blockchain network. The operations of method 800 may solve a cryptographic puzzle to achieve the proof of work consensus for executing the cryptographic operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing power consumption data for a distributed system in blockchains by a processor, comprising:
   determining, by one or more blockchain nodes currently executing a proof of work on one of a plurality of transactions upon executing a cryptographic operation in a blockchain network, an estimation of an entropy for the proof of work as a function of a complexity of the proof of work in bits;
   determining, by the or more blockchain nodes, an average number of operations to perform the proof of work based on a ratio of throughput of a respective node of the one or more blockchain nodes compared to a total network throughput of the blockchain network;
   computing, by the one or more blockchain nodes, an average energy of the respective node using the estimation of the entropy, the estimation of the average number of operations, and a temperature sink of the respective node;
   estimating, by the one or more blockchain nodes, energy consumption of the respective node based on the average energy of the respective node and a current block rate of the blockchain network, and
   executing, by the one or more blockchain nodes, the proof of work on additional transactions of the plurality of transactions based upon the estimated energy consumption.

2. The method of claim 1, further including estimating the average number of operations of the one or more blockchain nodes for both a total hashing power and a local hashing power.

3. The method of claim 1, further including determining an entropy lower bound for an increase in entropy using an irreversible bit operation.

4. The method of claim 3, further including:
   applying the entropy lower bound to the plurality of transactions on each of the one or more blockchain nodes; and estimating the increase in the entropy for the one or more blockchain nodes.

5. The method of claim 1, further including:
determining an entropy per node using a Landauer limit that establishes an entropy lower bound for an increase in the entropy by an irreversible bit operation; and
determining an average energy consumption for each of the one or more blockchain nodes using the entropy lower bound on the proof of work in the blockchain network.

6. The method of claim 1, further including solving a cryptographic puzzle to achieve a proof of work consensus for executing the cryptographic operation.

7. A system for providing power consumption data for a distributed system in blockchains in a computing environment, comprising: one or more computers with executable instructions that when executed cause the system to:
determine, by one or more blockchain nodes currently executing a proof of work on one of a plurality of transactions upon executing a cryptographic operation in a blockchain network, an estimation of an entropy for the proof of work as a function of a complexity of the proof of work in bits;
determine, by the or more blockchain nodes, of an average number of operations to perform the proof of work based on a ratio of throughput of a respective node of the one or more blockchain nodes compared to a total network throughput of the blockchain network;
compute, by the one or more blockchain nodes, an average energy of the respective node using the estimation of the entropy, the estimation of the average number of operations, and a temperature sink of the respective node;
estimate, by the one or more blockchain nodes, energy consumption of the respective node based on the average energy of the respective node and a current block rate of the blockchain network; and
execute, by the one or more blockchain nodes, the proof of work on additional transactions of the plurality of transactions based upon the estimated energy consumption.

8. The system of claim 7, wherein the executable instructions that when executed cause the system to estimate the average number of operations of the one or more blockchain nodes for both a total hashing power and a local hashing power.

9. The system of claim 7, wherein the executable instructions that when executed cause the system to determine an entropy lower bound for an increase in entropy using an irreversible bit operation.

10. The system of claim 9, wherein the executable instructions that when executed cause the system to:
apply the entropy lower bound to the plurality of transactions on each of the one or more blockchain nodes; and
estimate the entropy increase for the one or more blockchain nodes.

11. The system of claim 7, wherein the executable instructions that when executed cause the system to:
determine an entropy per node using a Landauer limit that establishes an entropy lower bound for an increase in the entropy by an irreversible bit operation; and
determine an average energy consumption for each of the one or more blockchain nodes using the entropy lower bound on the proof of work in the blockchain network.

12. The system of claim 7, wherein the executable instructions that when executed cause the system to solve a cryptographic puzzle to achieve a proof of work consensus for executing the cryptographic operation.

13. A computer program product for providing power consumption data for a distributed system in blockchains by a processor, the computer program product comprising a non-transitory computer-readable storage medium having computer-readable program code portions stored therein, the computer-readable program code portions comprising:
an executable portion that determines, by one or more blockchain nodes currently executing a proof of work on one of a plurality of transactions upon executing a cryptographic operation in a blockchain network, an estimation of an entropy for the proof of work as a function of a complexity of the proof of work in bits;
an executable portion that determines, by the or more blockchain nodes, an average number of operations to perform the proof of work based on a ratio of throughput of a respective node of the one or more blockchain nodes compared to a total network throughput of the blockchain network;
an executable portion that computes, by the one or more blockchain nodes, an average energy of the respective node using the estimation of the entropy, the estimation of the average number of operations, and a temperature sink of the respective node;
an executable portion that estimates, by the one or more blockchain nodes, energy consumption of the respective node based on the average energy of the respective node and a current block rate of the blockchain network; and
an executable portion that executes, by the one or more blockchain nodes, the proof of work on additional transactions of the plurality of transactions based upon the estimated energy consumption.

14. The computer program product of claim 13, further including an executable portion that estimates the average number of operations of the one or more blockchain nodes for both a total hashing power and a local hashing power.

15. The computer program product of claim 13, further including an executable portion that determines an entropy lower bound for an increase in entropy using an irreversible bit operation.

16. The computer program product of claim 15, further including an executable portion that:
applies the entropy lower bound to the plurality of transactions on each of the one or more blockchain nodes; and
estimates the entropy increase for the one or more blockchain nodes.

17. The computer program product of claim 13, further including an executable portion that:
determines an entropy per node using a Landauer limit that establishes an entropy lower bound for an increase in the entropy by an irreversible bit operation; and
determines an average energy consumption for each of the one or more blockchain nodes using the entropy lower bound on the proof of work in the blockchain network.

18. The computer program product of claim 13, further including an executable portion that solves a cryptographic puzzle to achieve a proof of work consensus for executing the cryptographic operation.

* * * * *